US012768275B2

(12) United States Patent
Tatton et al.

(10) Patent No.: US 12,768,275 B2
(45) Date of Patent: Oct. 20, 2026

(54) BLADE CONFIGURED FOR IMPACT TOLERANCE

(71) Applicant: RTX CORPORATION, Farmington, CT (US)

(72) Inventors: Royce E. Tatton, Shelley, ID (US); George Alan Salisbury, East Hampton, CT (US)

(73) Assignee: RTX CORPORATION, Farmington, CT (US)

( * ) Notice: Subject to any disclaimer, the term of this patent is extended or adjusted under 35 U.S.C. 154(b) by 170 days.

(21) Appl. No.: 18/541,612

(22) Filed: Dec. 15, 2023

(65) Prior Publication Data

US 2025/0198292 A1 Jun. 19, 2025

(51) Int. Cl.
*F01D 5/14* (2006.01)
*F01D 5/28* (2006.01)
*F01D 9/04* (2006.01)

(52) U.S. Cl.
CPC ............. *F01D 5/147* (2013.01); *F01D 5/282* (2013.01); *F01D 9/041* (2013.01); *F05D 2220/36* (2013.01)

(58) Field of Classification Search
CPC . F01D 5/18; F01D 5/282; F01D 9/041; F01D 5/187; F01D 5/189; F01D 5/188; F01D 9/065; F01D 5/3015; F05D 2220/32; F05D 2220/36; F05D 2260/201; F05D 2250/711; F05D 2250/712
See application file for complete search history.

(56) References Cited

U.S. PATENT DOCUMENTS

| | | | | |
|---|---|---|---|---|
| 4,084,922 | A * | 4/1978 | Glenn | F01D 5/3053 416/193 A |
| 4,460,315 | A | 7/1984 | Tseng et al. | |
| 4,802,824 | A * | 2/1989 | Gastebois | F01D 5/284 416/193 A |
| 5,310,318 | A | 5/1994 | Lammas et al. | |

(Continued)

FOREIGN PATENT DOCUMENTS

| | | |
|---|---|---|
| DE | 4108085 | 9/1991 |
| EP | 3896253 | 10/2021 |
| GB | 1375327 | 11/1974 |

OTHER PUBLICATIONS

European Search Report for European Patent Application No. 24219992.5 mailed May 30, 2025.

*Primary Examiner* — Courtney D Heinle
*Assistant Examiner* — Andrew Thanh Bui
(74) *Attorney, Agent, or Firm* — Carlson, Gaskey & Olds, P.C.

(57) ABSTRACT

A blade for a fan of a gas turbine engine includes an airfoil section that spans along a radial direction between first and second radial ends, and a dovetail at the second end of the airfoil section. The airfoil section and the dovetail are comprised of a fiber-reinforced composite that includes inter-section fiber plies that each extend from the airfoil section into the dovetail and wedges that are interleaved with the inter-section fiber plies in the dovetail. The dovetail is asymmetric about the radial direction and has first and second circumferential sides that are sloped to face radially outwardly and form non-zero angles with the radial direction. One of the non-zero angles is 10° or less and a sum of the non-zero angles is from 35° to 45°.

18 Claims, 3 Drawing Sheets

(56) References Cited

U.S. PATENT DOCUMENTS

| | | | | |
|---|---|---|---|---|
| 7,503,751 | B2 | 3/2009 | Arrieta | |
| 8,100,662 | B2 | 1/2012 | Schreiber et al. | |
| 8,573,947 | B2 * | 11/2013 | Klinetob ............... | F01D 5/3007 416/248 |
| 8,951,016 | B2 | 2/2015 | Ahmad et al. | |
| 10,174,624 | B1 | 1/2019 | McCaffrey et al. | |
| 10,655,479 | B2 * | 5/2020 | Sippel ................... | F01D 5/3007 |
| 11,280,202 | B2 * | 3/2022 | McCaffrey ............ | F01D 5/3084 |
| 2012/0321477 | A1 * | 12/2012 | Gerstberger .......... | F01D 5/3015 416/220 R |
| 2016/0032739 | A1 * | 2/2016 | Sekihara ................... | F02C 3/04 415/208.1 |
| 2021/0317747 | A1 * | 10/2021 | Welch ....................... | F01D 5/20 |

* cited by examiner

BLADE CONFIGURED FOR IMPACT TOLERANCE

BACKGROUND

A gas turbine engine typically includes a fan section, a compressor section, a combustor section and a turbine section. Air entering the compressor section is compressed and delivered into the combustion section where it is mixed with fuel and ignited to generate a high-pressure and temperature core gas flow. The high-pressure and temperature core gas flow expands through the turbine section to drive the compressor and the fan section. The compressor section may include low and high pressure compressors, and the turbine section may also include low and high pressure turbines.

Airfoils in the fan section or other sections of the engine may be formed of composite materials. Composite materials are generally lighter in weight, but can challenge durability.

SUMMARY

A blade according to an example of the present disclosure includes an airfoil section spanning along a radial direction between first and second radial ends, and a dovetail at the second end of the airfoil section. The airfoil section and the dovetail are comprised of a fiber-reinforced composite including inter-section fiber plies each extending from the airfoil section into the dovetail and wedges interleaved with the inter-section fiber plies in the dovetail. The dovetail is asymmetric about the radial direction and has first and second circumferential sides that are sloped to face radially outwardly and form non-zero angles with the radial direction, one of the non-zero angles being 10° or less and a sum of the non-zero angles being from 35° to 45°.

In a further embodiment of any of the foregoing embodiments, the dovetail has a forward face, an aft face, and a dovetail body that extends from the forward face to the aft face. The aft face is circumferentially offset from the forward face such that the dovetail body curves from the forward face to the aft face.

In a further embodiment of any of the foregoing embodiments, the dovetail has a radially-inwardly facing side that is parallel to an axial direction that is perpendicular to the radial direction.

In a further embodiment of any of the foregoing embodiments, the one of the non-zero angles that is 10° or less is from 5° to 10°.

In a further embodiment of any of the foregoing embodiments, the first and second circumferential sides are flat.

In a further embodiment of any of the foregoing embodiments, the airfoil section defines a pressure side and a suction side. The first circumferential side has the non-zero angle that is less than 10°, and the first circumferential side is on the pressure side.

A gas turbine engine according to an example of the present disclosure includes a fan section disposed about an engine axis, a hub including a plurality of axial doveslots, and a plurality of fan blades. Each fan blade includes an airfoil section spanning along a radial direction between first and second radial ends, and a dovetail at the second end of the airfoil section. The dovetail is disposed in one of the doveslots to attach the fan blade with the hub. The airfoil section and the dovetail are comprised of a fiber-reinforced composite having inter-section fiber plies each extending from the airfoil section into the dovetail and wedges interleaved with the inter-section fiber plies in the dovetail. The dovetail defines first and second circumferential sides that are sloped to face radially outwardly and form non-zero angles with the radial direction, one of the non-zero angles being 10° or less and a sum of the non-zero angles is from 35° to 45°.

In a further embodiment of any of the foregoing embodiments, the dovetail has a forward face, an aft face, and a dovetail body that extends from the forward face to the aft face. The aft face is circumferentially offset from the forward face such that the dovetail body curves from the forward face to the aft face.

In a further embodiment of any of the foregoing embodiments, the dovetail has a radially-inwardly facing side that is parallel to an axial direction that is perpendicular to the radial direction.

In a further embodiment of any of the foregoing embodiments, the one of the non-zero angles that is 10° or less is from 5° to 10°.

In a further embodiment of any of the foregoing embodiments, the first and second circumferential sides are flat.

In a further embodiment of any of the foregoing embodiments, the airfoil section defines a pressure side and a suction side, the first circumferential side has the non-zero angle that is less than 10°, and the first circumferential side is on the pressure side.

In a further embodiment of any of the foregoing embodiments, the airfoil section is connected by a neck to the dovetail, the neck being a location at which the airfoil section flares to form the dovetail, and the neck is radially outboard of the doveslot.

A gas turbine engine according to an example of the present disclosure includes a fan hub having an axial doveslot, and a fan blade including an airfoil section defining a pressure side and a suction side. The airfoil section spans along a radial direction between first and second radial ends. A dovetail at the second end of the airfoil section is disposed in the doveslot to attach the fan blade with the fan hub. The airfoil section and the dovetail are comprised of a fiber-reinforced composite including inter-section fiber plies each extending from the airfoil section into the dovetail and wedges interleaved with the inter-section fiber plies in the dovetail. The dovetail defines a first circumferential side on the suction side and second circumferential side on the pressure side upon an impact event on the pressure side of the airfoil section. A bending is induced in which the first circumferential side presses against a side of the doveslot, creating stress at a neck at which the airfoil section flares to form the dovetail, and the first and second circumferential side is sloped to face radially outwardly and form non-zero angles with the radial direction. The non-zero angle of the first circumferential side being 10° or less in order to reduce concentration of the stress at the neck.

In a further embodiment of any of the foregoing embodiments, the one of the non-zero angles that is 10° or less is from 5° to 10°.

In a further embodiment of any of the foregoing embodiments, the first and second circumferential sides are flat.

In a further embodiment of any of the foregoing embodiments, the dovetail has a forward face, an aft face, and a dovetail body that extends from the forward face to the aft face. The aft face is circumferentially offset from the forward face such that the dovetail body curves from the forward face to the aft face.

In a further embodiment of any of the foregoing embodiments, the dovetail has a radially-inwardly facing side that is parallel to an axial direction that is perpendicular to the radial direction.

The present disclosure may include any one or more of the individual features disclosed above and/or below alone or in any combination thereof.

BRIEF DESCRIPTION OF THE DRAWINGS

The various features and advantages of the present disclosure will become apparent to those skilled in the art from the following detailed description. The drawings that accompany the detailed description can be briefly described as follows.

Figure 1:
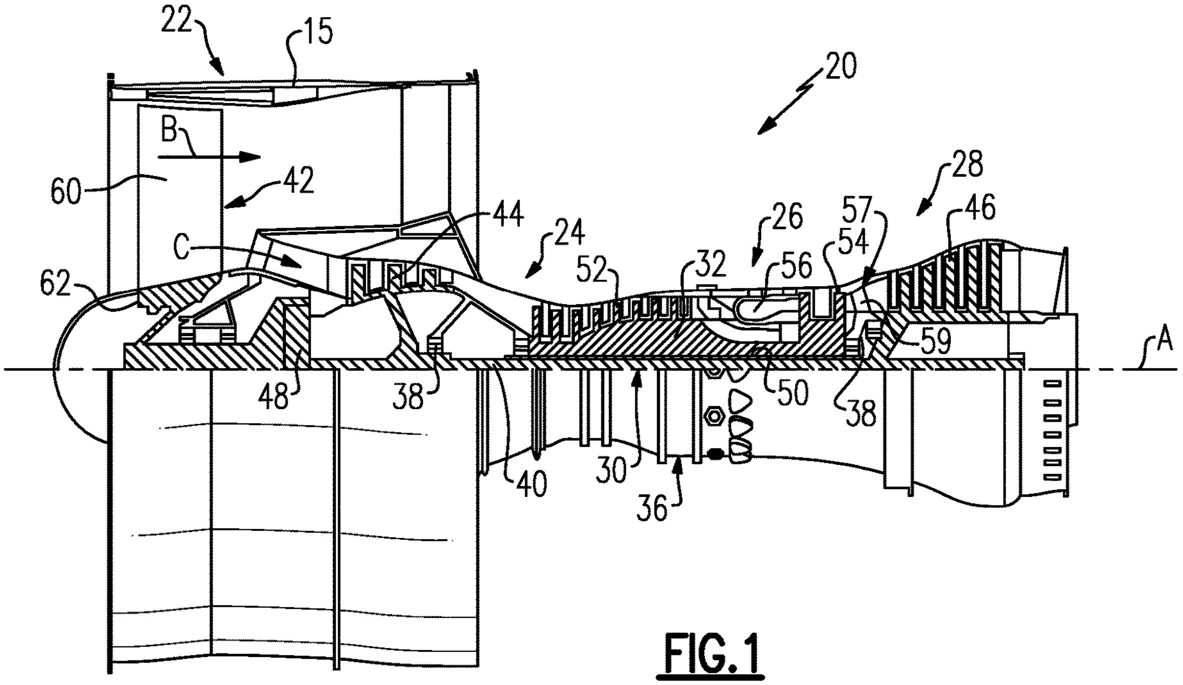
FIG. 1 illustrates a gas turbine engine.

In this disclosure, like reference numerals designate like elements where appropriate and reference numerals with the addition of one-hundred or multiples thereof designate modified elements that are understood to incorporate the same features and benefits of the corresponding elements. Terms such as “first” and “second” used herein are to differentiate that there are two architecturally distinct components or features. Furthermore, the terms “first” and “second” are interchangeable in that a first component or feature could alternatively be termed as the second component or feature, and vice versa.

DETAILED DESCRIPTION

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), and can be less than or equal to about 18.0, or more narrowly can be less than or equal to 16.0. The geared architecture 48 is an epicyclic gear train, such as a planetary gear system or other gear system, with a gear reduction ratio of greater than about 2.3. The gear reduction ratio may be less than or equal to 4.0. The low pressure turbine 46 has a pressure ratio that is greater than about five. The low pressure turbine pressure ratio can be less than or equal to 13.0, or more narrowly less than or equal to 12.0. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to an inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as “bucket cruise Thrust Specific Fuel Consumption (‘TSFC’)”—is the industry standard parameter of lbm of fuel being burned divided by lbf of thrust the engine produces at that minimum point. The engine parameters described above and those in this paragraph are measured at this condition unless otherwise specified. “Low fan pressure ratio” is the pressure ratio across the fan blade alone, without a Fan Exit Guide Vane (“FEGV”) system. The low fan pressure ratio as disclosed herein according to one non-limiting embodiment is less than about 1.45, or more narrowly greater than or equal to 1.25. “Low corrected fan tip speed” is the actual fan tip speed in ft/sec divided by an industry standard temperature correction of $[(\text{Tram }°\text{R})/(518.7°\text{R})]^{0.5}$. The "Low corrected fan tip speed" as disclosed herein according to one non-limiting embodiment is less than about 1150.0 ft/second (350.5 meters/second), and can be greater than or equal to 1000.0 ft/second (304.8 meters/second).

Figure 2:
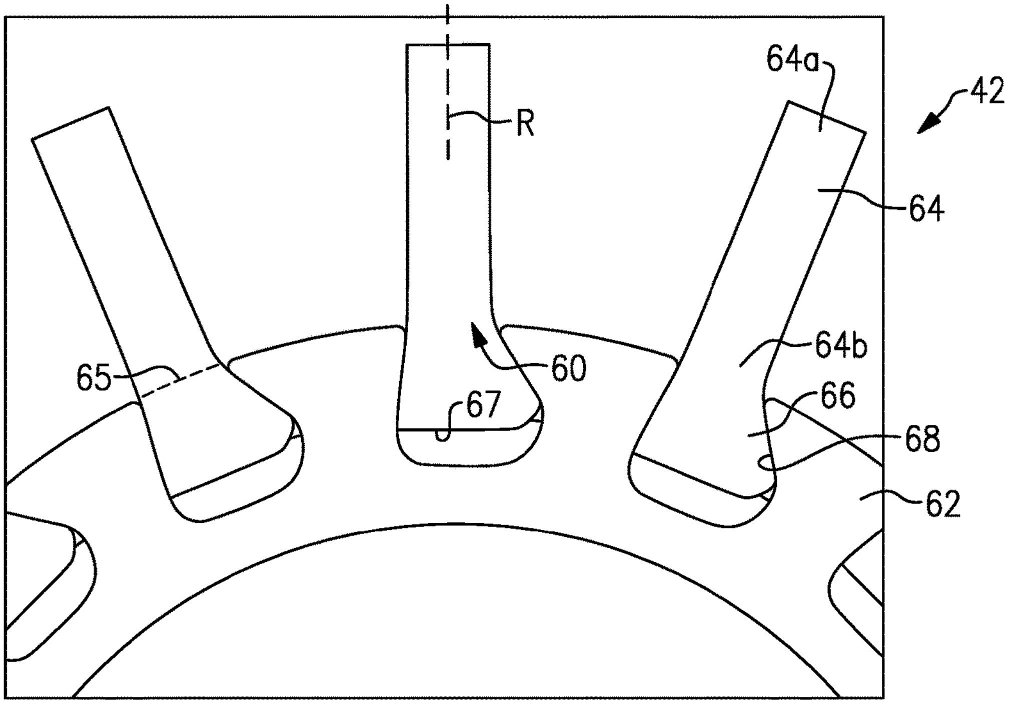
FIG. 2 illustrates a portion of the fan section of the engine.

Turning again to the fan section 22, the fan 42 includes fan blades 60 that are attached with a fan hub 62. FIG. 2 illustrates a portion of the fan 42. Each fan blade 60 includes an airfoil section 64 that spans along a radial direction R between first and second radial ends 64*a* (outer)/64*b* (inner), and a dovetail 66 located at the second end 64*b* of the airfoil section 64. The airfoil section 64 connected by a neck 65 to the dovetail 66. The neck 65 is a location at which the airfoil section 64 starts to flare to form the dovetail 66.

Figure 3:
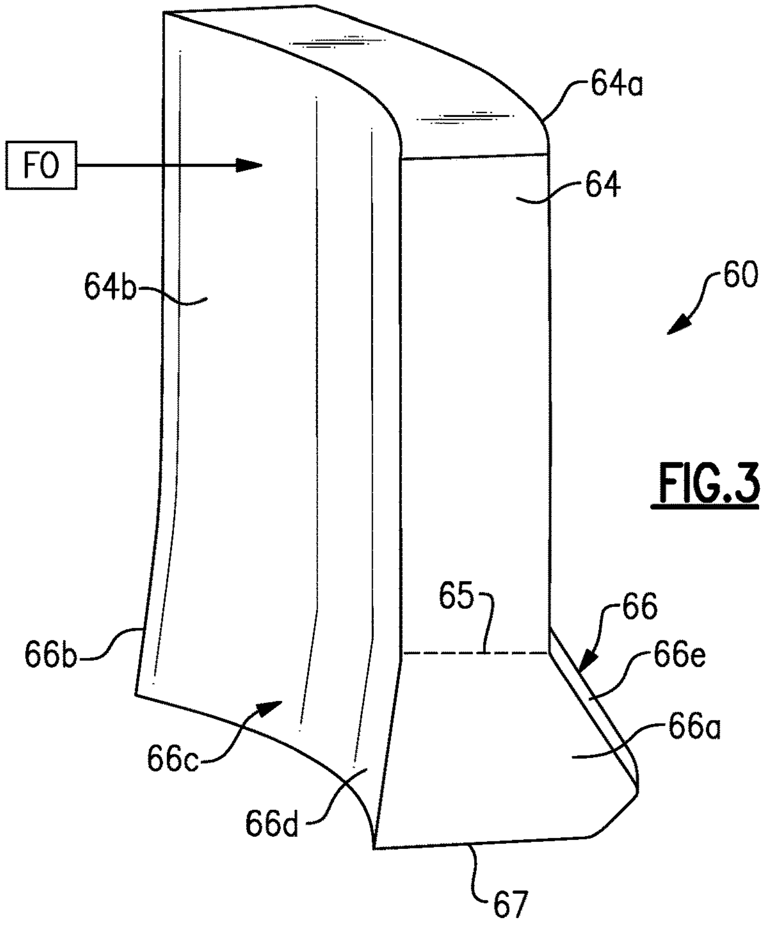
FIG. 3 illustrates a fan blade from the fan section.

As shown in FIG. 3, the dovetail 66 has a forward face 66*a*, an aft face 66*b*, and a dovetail body 66*c* that extends from the forward face 66*a* to the aft face 66*b*. The dovetail body has a radially-inwardly facing side 67 that is parallel along its full axial length to the engine axis A. In this example, the aft face 66*b* is circumferentially offset from the forward face 66*a* such that the dovetail body 66*c* curves from the forward face 66*a* to the aft face 66*b*. For instance, the dovetail body 66*c* curves continuously from forward face 66*a* to aft face 66*b*. Alternatively, the dovetail body 66*c* may be straight instead of curved, in which case the faces 66*a*/66*b* will have no circumferential offset. A straight design is somewhat compliant (able to roll) due to impact loads, and is generally easier to manufacture and inspect. A curved design is more closely aligned with the curvature of the airfoil root and therefore generally creates a smoother transition between the airfoil and the dovetail; however, it is more complex to manufacture and inspect and creates a somewhat less compliant attachment for impact loads (compared to a straight design).

The fan hub 62 includes a plurality of axial doveslots 68 that extend from the forward face to the aft face of the hub 62. The doveslots 68 are also curved and are generally of complementary geometry to the geometry of the dovetails 66 such that the dovetails 66 interlock with the doveslots 68 to radially retain the blades 60 on the hub 62. Although not shown, a wear pad, wear coating, or the like may be provided between the dovetail 66 and the sides of the doveslot 68 to reduce wear on the dovetail 66, the doveslot 68, or both.

Figure 4:
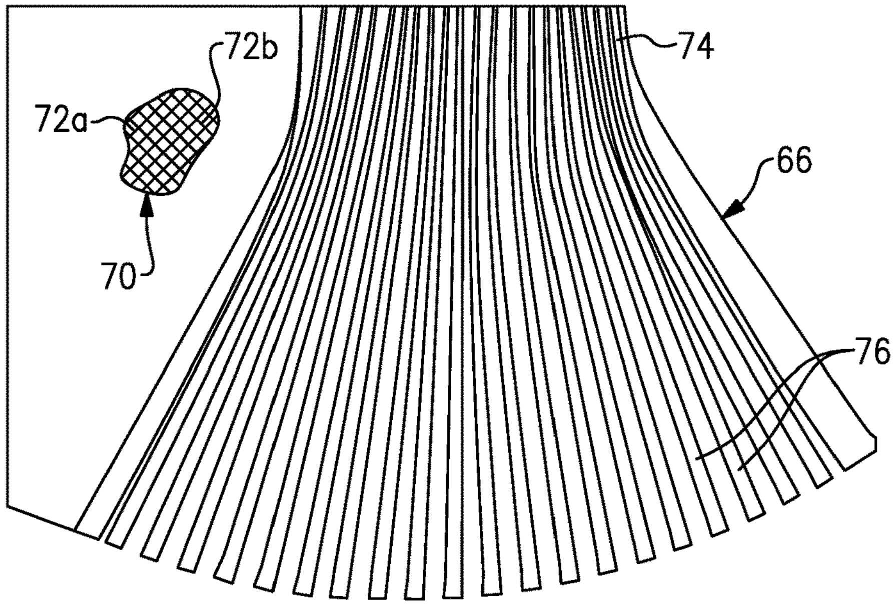
FIG. 4 illustrates the dovetail of the fan blades, with fibers plies.

Referring to FIG. 4, the airfoil section 64 and the dovetail 66 are formed of a fiber-reinforced composite material 70 (shown in cutaway). The composite material 70 generally includes fiber tows 72*a* disposed in a matrix 72*b*. For example, the fiber tows 72*a* are lightweight, high-strength fiber tows, such as but not limited to, carbon fiber tows, aramid fiber tows, or glass fiber tows. The matrix 72*b* is a polymer matrix, such as but not limited to, epoxy.

The composite material 70 includes inter-section fiber plies 74. A "ply" refers to a layer of fiber tows. For example, the layer includes a woven fabric, a tape with multiple fiber tows, or multiple fabrics and/or tapes that together make-up a distinct layer. The prefix "inter-" means that each ply 74 extends in both the airfoil section 64 and the dovetail 66. In the dovetail 66, there are wedges 76 interleaved with the plies 74 and that serve to increase the dovetail width and form the flared shape of the dovetail 66. The plies 74 and the wedges 76 extend the full axial length of the blade 62.

Engines may occasionally ingest foreign objects. The foreign objects can impact airfoils, particularly fan blades at the front of the engine 20. Such impacts can induce bending stresses on one or more blades in the fan. In that regard, fan blades that are formed of fiber-reinforced composites that have fiber plies may experience fiber ply delamination along the boundary between plies when subjected to bending stresses from foreign object impacts. In particular, at the neck where the blade flares to form the dovetail there is a curvature that can act as a stress riser, concentrating induced bending stress in a relatively small region, which may then cause delamination. Extensive delamination and blade damage could in some instances lead to blade detachment. As will be discussed below, the dovetails 66 of the disclosed blades 60 have an asymmetric geometry that is configured to reduce stress concentration from impacts on the blade, thus enhancing blade durability.

Figure 5:
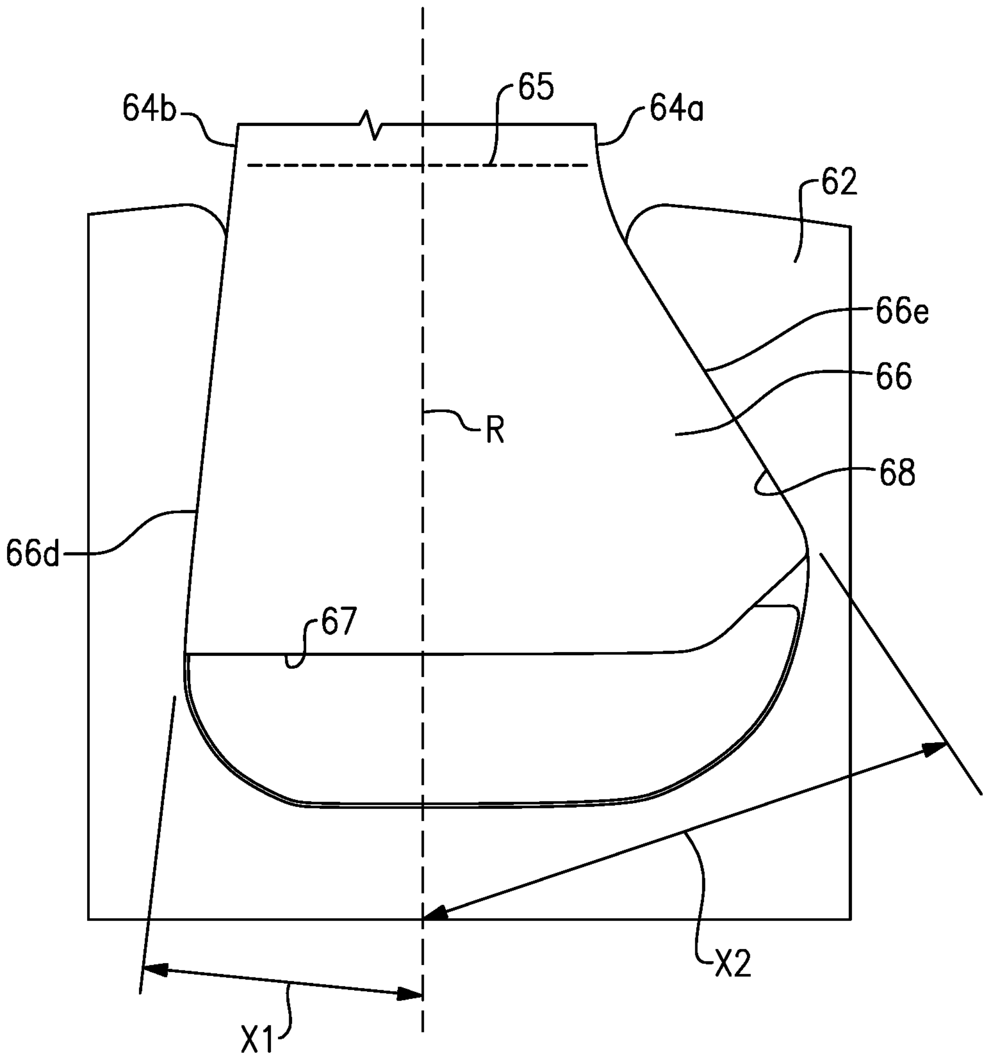
FIG. 5 illustrates the asymmetric shape of the dovetail.

FIG. 5 illustrates an axial view of a representative one of the dovetails 66 in the doveslot 68. The dovetail 66 is asymmetric about the radial direction R. For instance, at all cross-sections through the dovetail 66 taken in a plane perpendicular to the engine axis A, the profile of the cross-section of the dovetail 66 is asymmetric relative to the radial direction, wherein the radial direction at each cross-section bisects the cross-section of the airfoil section 64. In this regard, the dovetail 66 includes first and second circumferential sides 66*d*/66*e* that are sloped so as to have a radial component, i.e., the sides 66*d*/66*e* face radially outwardly and, at least at times, engage the sides of the doveslot 68 to retain the blade 60 on the hub 62. The sides 66*d*/66*e* are flat such that contact stresses across the sides can be evenly distributed by interfacial contact with the sides of the doveslot 68.

The sides 66*d*/66*e* each form a different non-zero angle, designated at X1 and X2 in FIG. 5. The angles X1 and X2 are taken relative to the radial direction R such that the included angles open radially inwardly. One of the non-zero angles, in this example X1, is 10° or less, for example from 5° to 10°. Moreover, the sum of the angles X1 and X2 is from 35° to 45°. The angle X1 of 10° or less provides a relatively low stress concentration factor at the neck 65. For instance, the airfoil section 64 defines a suction side 64*a* and a pressure side 64*b*, the first circumferential side 66*d* has the angle X1 that is less than 10°, and the first circumferential side 66*d* is on the pressure side 64*b*. As depicted in FIG. 3, the pressure side 64*b* is oriented such that, given the rotation of the fan blades 60 about the axis A, the foreign object "FO" will primarily impact the pressure side 64*b*. The impact induces a bending of the blade 60 in which the first circumferential side 66*d* of the dovetail 66 will be urged forward to press against a side of the doveslot, creating stress at the neck 65 (which is radially outboard of the doveslot 68) on the pressure side 64*b*. However, as the angle X1 is relatively low, the radius of curvature at the neck 65 is relatively large (in comparison to the smaller radius of curvature at the neck on the suction side 64*a* due to the larger angle X1), which reduces or limits the stress concentration. As a result, the blade 60 will be more tolerant to foreign object impact that may otherwise result in substantial delamination.

Additionally, the sum of the angles X1 and X2 (from 35° to 45°) is thought to represent a useful balance between the shallowness of the angle X1 to reduce stress concentration versus the need to have enough of a radial component to the slopes of the sides 66*d*/66*e* to ensure that the blade can remain retained in the doveslot 68 under the centrifugal force on the blade 60 during rotation. Accordingly, the blade 60 is configured to mitigate impact damage by managing the induced bending stresses to avoid high stress concentrations that could otherwise lead to substantial delamination.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A blade comprising:

an airfoil section spanning along a radial direction between first and second radial ends; and a dovetail at the second end of the airfoil section, the airfoil section and the dovetail being comprised of a fiber-reinforced composite including inter-section fiber plies each extending from the airfoil section into the dovetail and wedges interleaved with the inter-section fiber plies in the dovetail, the dovetail being asymmetric about the radial direction and having first and second circumferential sides that are sloped to face radially outwardly and form non-zero angles with the radial direction, one of the non-zero angles being 10° or less and a sum of the non-zero angles being from 35° to 45°.

2. The blade as recited in claim 1, wherein the dovetail has a forward face, an aft face, and a dovetail body that extends from the forward face to the aft face, the aft face being circumferentially offset from the forward face such that the dovetail body curves from the forward face to the aft face.

3. The blade as recited in claim 2, wherein the dovetail has a radially-inwardly facing side that is parallel to an axial direction that is perpendicular to the radial direction.

4. The blade as recited in claim 3, wherein the one of the non-zero angles that is 10° or less is from 5° to 10°.

5. The blade as recited in claim 1, wherein the first and second circumferential sides are flat.

6. The blade as recited in claim 1, wherein the airfoil section defines a pressure side and a suction side, the first circumferential side has the non-zero angle that is less than 10°, and the first circumferential side is on the pressure side.

7. A gas turbine engine comprising:

a fan section disposed about an engine axis and having a hub including a plurality of axial doveslots; and a plurality of fan blades, each fan blade including:

an airfoil section spanning along a radial direction between first and second radial ends;

a dovetail at the second end of the airfoil section, the dovetail being disposed in one of the doveslots to attach the fan blade with the hub, the airfoil section and the dovetail being comprised of a fiber-reinforced composite including inter-section fiber plies each extending from the airfoil section into the dovetail and wedges interleaved with the inter-section fiber plies in the dovetail, the dovetail defining first and second circumferential sides that are sloped to face radially outwardly and form non-zero angles with the radial direction, one of the non-zero angles being 10° or less and a sum of the non-zero angles is from 35° to 45°.

8. The gas turbine engine as recited in claim 7, wherein the dovetail has a forward face, an aft face, and a dovetail body that extends from the forward face to the aft face, the aft face being circumferentially offset from the forward face such that the dovetail body curves from the forward face to the aft face.

9. The gas turbine engine as recited in claim 8, wherein the dovetail has a radially-inwardly facing side that is parallel to an axial direction that is perpendicular to the radial direction.

10. The gas turbine engine as recited in claim 9, wherein the one of the non-zero angles that is 10° or less is from 5° to 10°.

11. The gas turbine engine as recited in claim 7, wherein the first and second circumferential sides are flat.

12. The gas turbine engine as recited in claim 7, wherein the airfoil section defines a pressure side and a suction side, the first circumferential side has the non-zero angle that is less than 10°, and the first circumferential side is on the pressure side.

13. The gas turbine engine as recited in claim 7, wherein the airfoil section is connected by a neck to the dovetail, the neck being a location at which the airfoil section flares to form the dovetail, and the neck is radially outboard of the doveslot.

14. A gas turbine engine comprising:

a fan hub including an axial doveslot; and a fan blade including:

an airfoil section defining a pressure side and a suction side, the airfoil section spanning along a radial direction between first and second radial ends;

a dovetail at the second end of the airfoil section, the dovetail being disposed in the doveslot to attach the fan blade with the fan hub, the airfoil section and the dovetail being comprised of a fiber-reinforced composite including inter-section fiber plies each extending from the airfoil section into the dovetail and wedges interleaved with the inter-section fiber plies in the dovetail, the dovetail defining a first circumferential side on the suction side and second circumferential side on the pressure side, and the dovetail being asymmetric about the radial direction, wherein upon an impact event on the pressure side of the airfoil section, a bending is induced in which the first circumferential side presses against a side of the doveslot, creating stress at a neck at which the airfoil section flares to form the dovetail, and wherein the first and second circumferential side being sloped to face radially outwardly and form non-zero angles with the radial direction, the non-zero angle of the first circumferential side being 10° or less in order to reduce concentration of the stress at the neck, and a sum of the non-zero angles is from 35° to 45°.

15. The gas turbine engine as recited in claim 14, wherein the one of the non-zero angles that is 10° or less is from 5° to 10°.

16. The gas turbine engine as recited in claim 15, wherein the first and second circumferential sides are flat.

17. The gas turbine engine as recited in claim 16, wherein the dovetail has a forward face, an aft face, and a dovetail body that extends from the forward face to the aft face, the aft face being circumferentially offset from the forward face such that the dovetail body curves from the forward face to the aft face.

18. The gas turbine engine as recited in claim 17, wherein the dovetail has a radially-inwardly facing side that is parallel to an axial direction that is perpendicular to the radial direction.

* * * * *